US012669578B2

(12) United States Patent
Teague et al.

(10) Patent No.: US 12,669,578 B2
(45) Date of Patent: Jun. 30, 2026

(54) INTEGRATED AESA/RADAR IN-SITU CALIBRATION IP DISCLOSURE

(71) Applicant: Rockwell Collins, Inc., Cedar Rapids, IA (US)

(72) Inventors: Jacob G. Teague, West Melbourne, FL (US); James B. West, Cedar Rapids, IA (US); Mark Fersdahl, Cedar Rapids, IA (US); Connor C. McBryde, Cedar Rapids, IA (US); Yoel H. Sonera, Palm Bay, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 18/427,632

(22) Filed: Jan. 30, 2024

(65) Prior Publication Data

US 2025/0244443 A1      Jul. 31, 2025

(51) Int. Cl.
*G01S 7/40*        (2006.01)
*G01S 13/02*       (2006.01)

(52) U.S. Cl.
CPC .............. *G01S 7/40* (2013.01); *G01S 7/4008* (2013.01); *G01S 7/4021* (2013.01); *G01S 2013/0254* (2013.01)

(58) Field of Classification Search
None
See application file for complete search history.

(56) References Cited

U.S. PATENT DOCUMENTS

| | | | |
|---|---|---|---|
| 8,358,681 B2 | 1/2013 | Izumi et al. | |
| 9,705,611 B1 | 7/2017 | West | |
| 9,866,336 B2 | 1/2018 | Geis et al. | |
| 10,663,563 B2 | 5/2020 | Schuman | |
| 11,705,974 B2 | 7/2023 | West et al. | |
| 2018/0248262 A1 | 8/2018 | Freyssinier et al. | |
| 2021/0376938 A1* | 12/2021 | West | H04B 17/19 |
| 2023/0108249 A1 | 4/2023 | Avci et al. | |

FOREIGN PATENT DOCUMENTS

| | | |
|---|---|---|
| CN | 10915032 A | 1/2019 |
| EP | 3834312 A1 | 6/2021 |
| EP | 3427417 B1 | 5/2022 |
| KR | 102241805 B1 | 4/2021 |

OTHER PUBLICATIONS

KR102241805 translation (Year: 2021).*
European Patent Office, Extended European Search Report received in EP Application No. 25154231.2, Jun. 2, 2025, 9 pages.

* cited by examiner

*Primary Examiner* — Whitney Moore
(74) *Attorney, Agent, or Firm* — Suiter Swantz IP

(57) ABSTRACT

A system for insitu AESA calibration includes a radar receiver/excitor (XR). The calibrated XR functions as a precision multi-channel relative amplitude and phase microwave frequency measurement device that executes a known AESA calibration methodology. An integrated RF sensor system-level built in test (BIT) is utilized for prognostic health monitoring and self-healing calibration. During calibration, quadrants of the AESA are iteratively calibrated via measurements by the XR. I/Q values are balanced for each quadrant relative to each other without the need for a separately calibrated measurement device for absolute calibration. A near field probe may be disposed for radiative loopback measurements. A T/R calibration circuit receives the loopback measurements and data from a Tx channel.

17 Claims, 8 Drawing Sheets

INTEGRATED AESA/RADAR IN-SITU CALIBRATION IP DISCLOSURE

BACKGROUND

The need exists for a real-time flight in-situ active electronically scanned array (AESA) self-calibration capability for multi-mode radar and other radio frequency (RF) sensor systems. Such calibration is necessary to verify minimum operational performance standards for civilian airspace systems including autonomous aircraft. In addition, there is a need to optimize mean time between failures, dispatchability, and availability for civilian and military manned and unmanned aircraft.

Radar systems require a hierarchical calibration scheme incorporating all dimensions of the radar processing unit/field programmable gate array (RPU/FPGA), Radar Transceiver (XR), each AESA subarray, AESA full-panel and multi-AESA full panel configurations. Such calibration must be operable for both transmit and receive functionality. In-situ self-calibration needs to be performed periodically throughout ground check and flight mission phasing based on changes to internal and external environmental effects, on demand, or the like, and when BIT discovers radar noteworthy performance degradation.

Calibration of AESA-based systems is particularly challenging due to the hundreds or thousands of individual RF and digital channels that need to be monitored and evaluated. Existing multi-channel transceiver calibration systems inject equi-amplitude and equi-phase frequency band signals into its Rx channels. The calibrating system's fundamental duty is to accurately determine relative amplitude and phase differences across the Tx and Rx paths at the transceiver level. This transceiver calibration methodology as described does not calibrate the AESA. Existing AESA-level calibration methodologies utilize precision test equipment, e.g., expensive pulsed Precision Network Analyzers (PNAs).

Existing systems assume that the PNA can accurately measure both transmitted and received RF amplitude and phase along with coded amplitude and phase transmit (Tx) and Rx calibration signals. There is no provision within existing AESA calibration techniques for XR-based channel-to-channel amplitude and phase balance self-calibration with subsequent integrated transceiver/AESA top level calibration which is required for platform in-situ system-level calibration and health monitoring and self-healing calibration.

SUMMARY

In one aspect, embodiments of the inventive concepts disclosed herein are directed to a system and method for insitu AESA calibration. The system includes a radar receiver/excitor (XR). The calibrated XR functions as a precision multi-channel relative amplitude and phase microwave frequency measurement device that executes a known AESA calibration methodology. An integrated RF sensor system-level built in test (BIT) is utilized for prognostic health monitoring and self-healing calibration.

During calibration, the transceiver executes a self-calibration to achieve relative multi-channel phase and amplitude imbalance through signal injection loop back techniques; then the quadrants or subarrays of the AESA are iteratively calibrated via measurements by the X digitized I/Q values, balanced for each quadrant or subarray relative to each other without the need for a separately calibrated measurement device for absolute calibration.

In a further aspect, a near field probe may be embedded with the AESA's aperture for radiative loopback measurements. A T/R calibration circuit receives the loopback measurements and data from a Tx channel.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
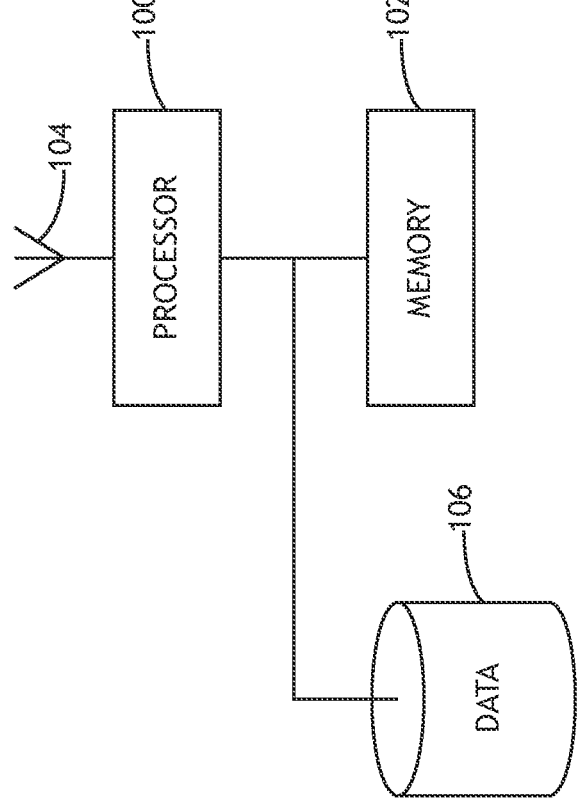
FIG. 1 shows a system suitable for implementing exemplary embodiments.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for in-situ AESA calibration. The system includes a radar receiver/exciter (XR). The calibrated XR functions as a precision multi-channel relative amplitude and phase microwave frequency measurement device that executes a known AESA calibration methodology. An integrated RF sensor system-level built in test (BIT) is utilized for prognostic health monitoring and self-healing calibration. During calibration, quadrants of the AESA are iteratively calibrated via measurements by the XR. I/Q values are balanced for each quadrant relative to each other without the need for a separately calibrated measurement device for absolute calibration. A near field probe may be disposed for radiative loopback measurements. A T/R calibration circuit receives the loopback measurements and data from a Tx channel.

Referring to FIG. 1, a system suitable for implementing exemplary embodiments is shown. The system, which may be embodied in a radar, comprises a processor 100 in data communication with a memory 102 for storing processor executable code, and an AESA 104. The processor 100 may comprise a radar processing unit, and may be embodied in a general programmable processor, a field programmable gate array, a dedicated processing unit, or the like. The processor 100 may include a central processing unit, an XR, and additional circuitry as described herein.

In at least one embodiment, the AESA 104 may define a plurality of distinct subarrays. Each subarray may be iteratively and independently calibrated. A near field probe may be disposed in front of, and in the near field of the AESA 104, and sideways at the same plane of the AESA 104. The probe may be in electronic communication with the processor 100 to perform radiative loopback measurements. The processor 100 may be configured to incorporate a frequency band loopback that can be turn on/off as needed.

For RF systems, loopback calibration is used wherein a signal is injected back into one or more receivers to calibrate the receivers without using the system. An ancillary radiating element bleeds energy back into the AESA 104 to calibrate the AESA 104. The process can work in both directions. The adjacent RF channel and radiating element can be a transmitter while the rest are in a receive mode or vice versa. A calibrator may judiciously transmit through certain portions, subarrays, or individual elements of the AESA 104 and then listen back with auxiliary circuitry.

The processor 100 may be configured to calculate calibrated I values and Q values for each subarray, and for the AESA 104 as a whole. Such calculations may be a function of quantized frequency band amplitude and phase values from most significant bit to least significant bit, mapped to the corresponding RF channel. In at least one embodiment, the processor 100 may be configured to determine a time delay mapped to a phase change stepped over frequency to accommodate ultra-wide band time delay-based AESA and XR calibration. Frequency band may include any frequency spectrum band where electrically large element count AESAs are practical, such as the X, Ku, and Ka Bands, SatCom, ultra-wide band electronic war fare apps., etc.

Figure 2:
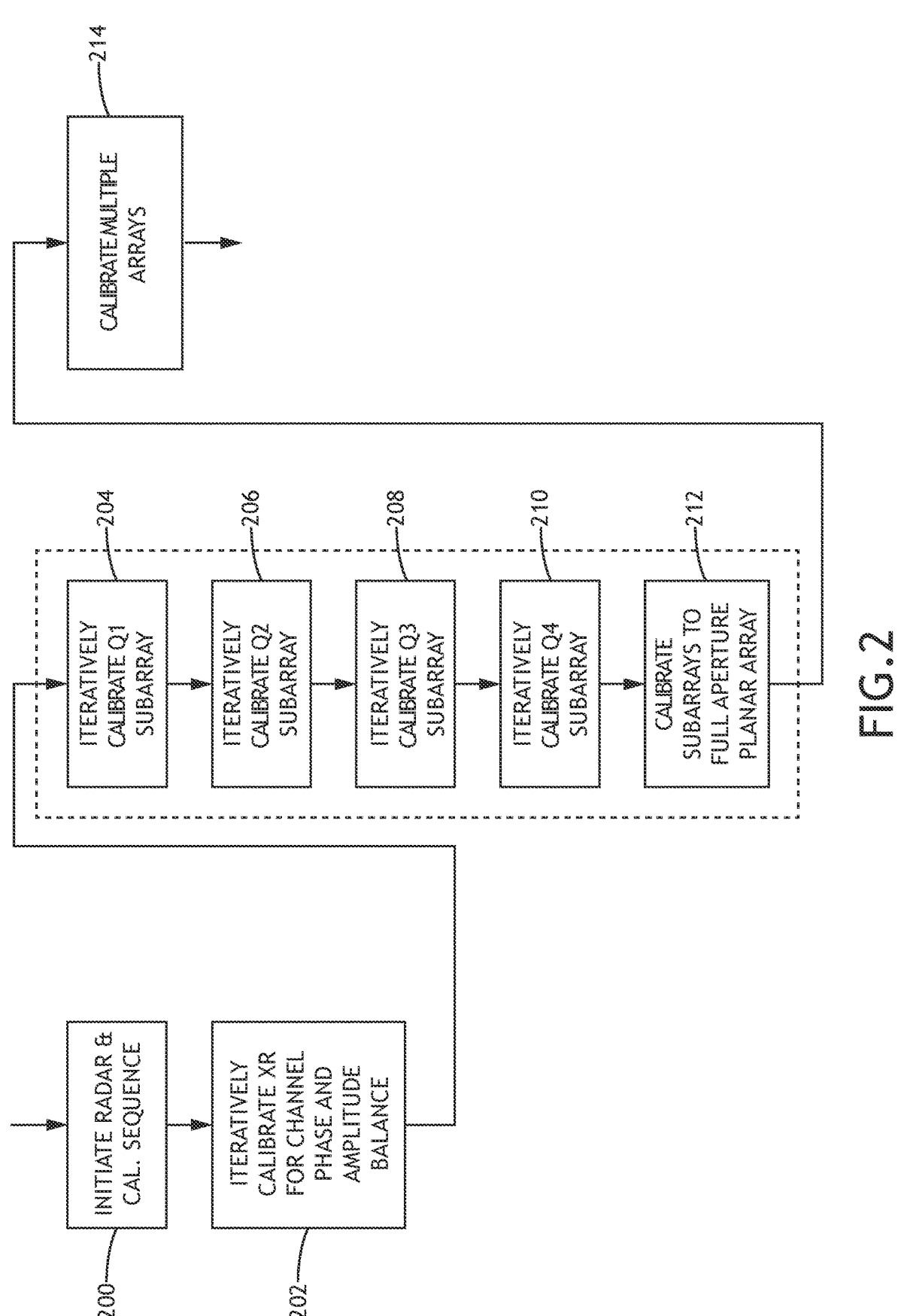
FIG. 2 shows a flowchart for a method according to an exemplary embodiment.

Referring to FIG. 2, a flowchart for a method according to an exemplary embodiment is shown. A radar system initiates 200 a calibration sequence (e.g., at startup, during some mission phase, based on changes to internal and external environmental effects, on demand, or the like). An XR is iteratively calibrated 202 for channel phase and amplitude balance. Internal and external environmental effects may include temperature, moisture, etc., wither with or without location information available.

Figure 3:
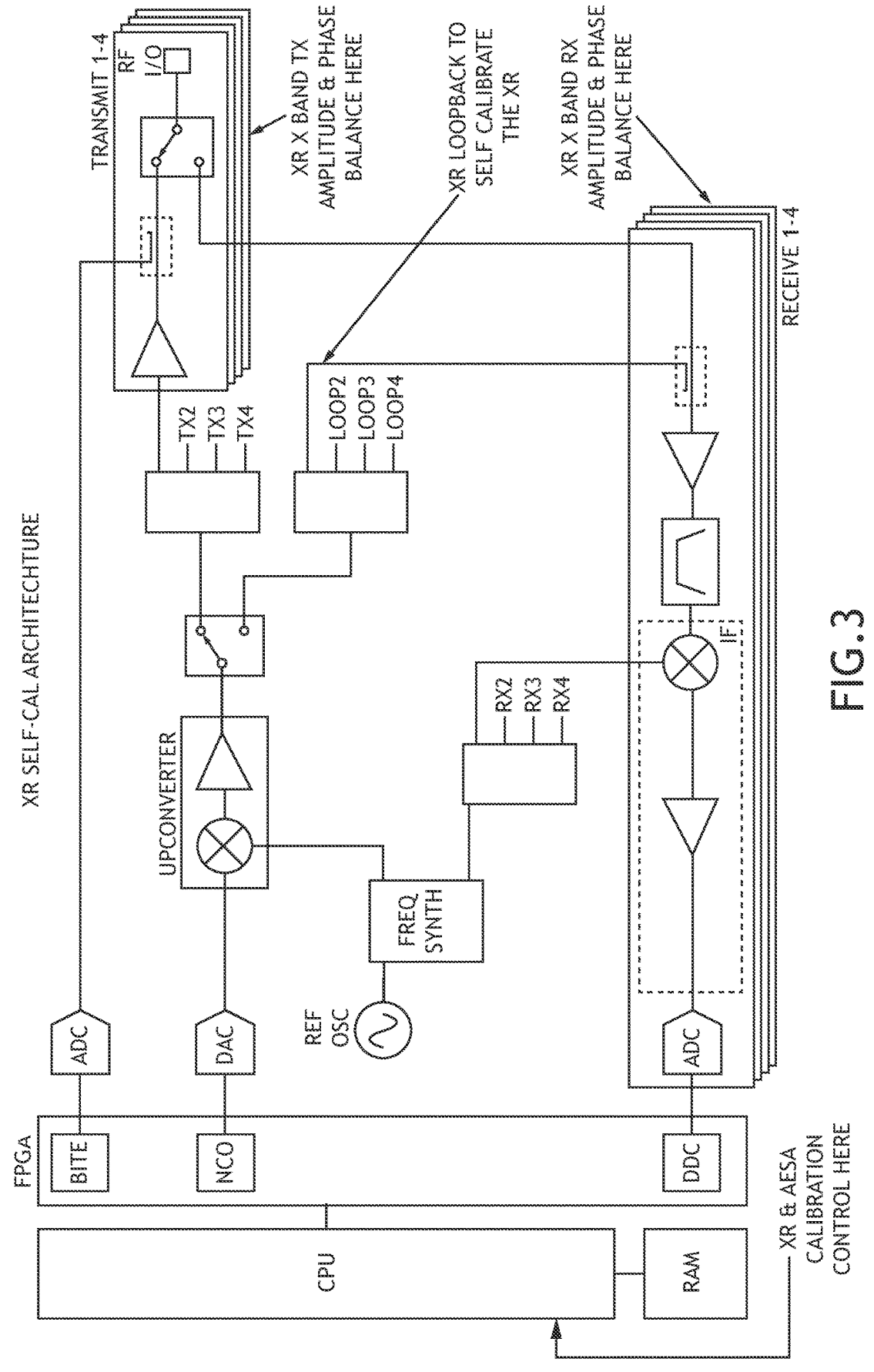
FIG. 3 shows a block diagram of a calibrator according to an exemplary embodiment.

The required XR transceiver architecture including the RF loopback signal routing necessary for XR-level channel balance calibration is depicted in FIG. 3. In at least one embodiment, during XR calibration 202, Tx lines are delay matched. The XR Rx channel analog-to-digital converters may have 12-14-bit resolution to quantize the amplitude and phase of complex signals. The XR may accurately determine relative amplitude and phase differences across Rx channels. In at least one embodiment, balanced amplitude and phases are expressed I/Q values for each receive channel. The calibrated XR functions as a relative channel-to-channel PNA. The relative difference in channel-to-channel amplitude and phase may be measured with the precision the analog-to-digital converter least significant bit. The XR's I/Q value for each channel may be used to indirectly measure relative amplitude and phase differences between the radiating element channels within an AESA. Such AESA-level measurements may then be used in Hadamard orthogonal coding.

The XR channel I value of the least significant bit represents a minima delta amplitude to measure at the AESA element level. Likewise, the XR channel Q value of the least significant bit represents a minima delta phase to measure at the AESA element level.

The XR is calibrated relative to itself. Tx loopback circuitry may be implemented within the XR to each channel. Each channel is calibrated via I/Q balancing across the XR's channels in a relative sense with AESA quadrants "out of the loop".

In at least one embodiment, a T/R calibration circuit provides Tx and Rx level shifts to achieve relative adequate signal-to-noise ratios between the AESA radiation coupling loop. XR architecture (as detailed in FIG. 3) may minimize Tx-to-Rx signal coupling, and compensate for magnitude/phase uncertainly due to clock reference instability Once the XR is calibrated, the calibration system may iteratively calibrate an AESA via the XR. Alternatively, the calibration system may iteratively calibrate 204, 206, 208, 210 each quadrant of the AESA (or some other subset of the AESA).

In at least one embodiment, the calibration system iteratively calibrates 204 a first quadrant or subarray of the AESA. The I value for the first quadrant may be a function of the quantized frequency band amplitude most significant bit to least significant bit, mapped to the AESA channel amplitude. Likewise, the Q value for the first quadrant may be a function of the quantized frequency band phase most significant bit to least significant bit, mapped to the AESA channel phase. In at least one embodiment, known code sequences can be run at the I/Q level. Once the first quadrant is self-calibrated, it may be used as a sensor to either directly calibrate the remaining quadrants/subarrays, or cross check the calibration of the remaining quadrants/subarrays.

In at least one embodiment, the calibration system may iteratively, sequentially calibrate 206, 208, 210 the remaining quadrants or subarrays of the AESA. The I values for the each quadrant may be a function of the quantized frequency band amplitude most significant bit to least significant bit, mapped to the AESA channel amplitude and the Q value may be a function of the quantized frequency band phase most significant bit to least significant bit, mapped to the AESA channel phase. In at least one embodiment, known code sequences can be run at the I/Q level.

In at least one embodiment, after the individual quadrants are iteratively calibrated 204, 206, 208, 210, the calibration system may calibrate 212 amplitude and phase to the full aperture of the array. Known code sequences can be run at the I/Q level to only adjust amplitude and phase at the quad levels relative to each other. At which point, the entire AESA is calibrated.

In at least one embodiment, multiple arrays may be calibrated 214, for example, two planar arrays calibrated in a chevron configuration for a synthetic planar array mode of operation, or tri-panel configuration for improved azimuthal beam scanning. Furthermore, non-planar AESAs that are sub-arrayed, truncated pyramid, semi-cylindrical, semi-hemispherical, and other aperture contours are envisioned.

Figure 4:
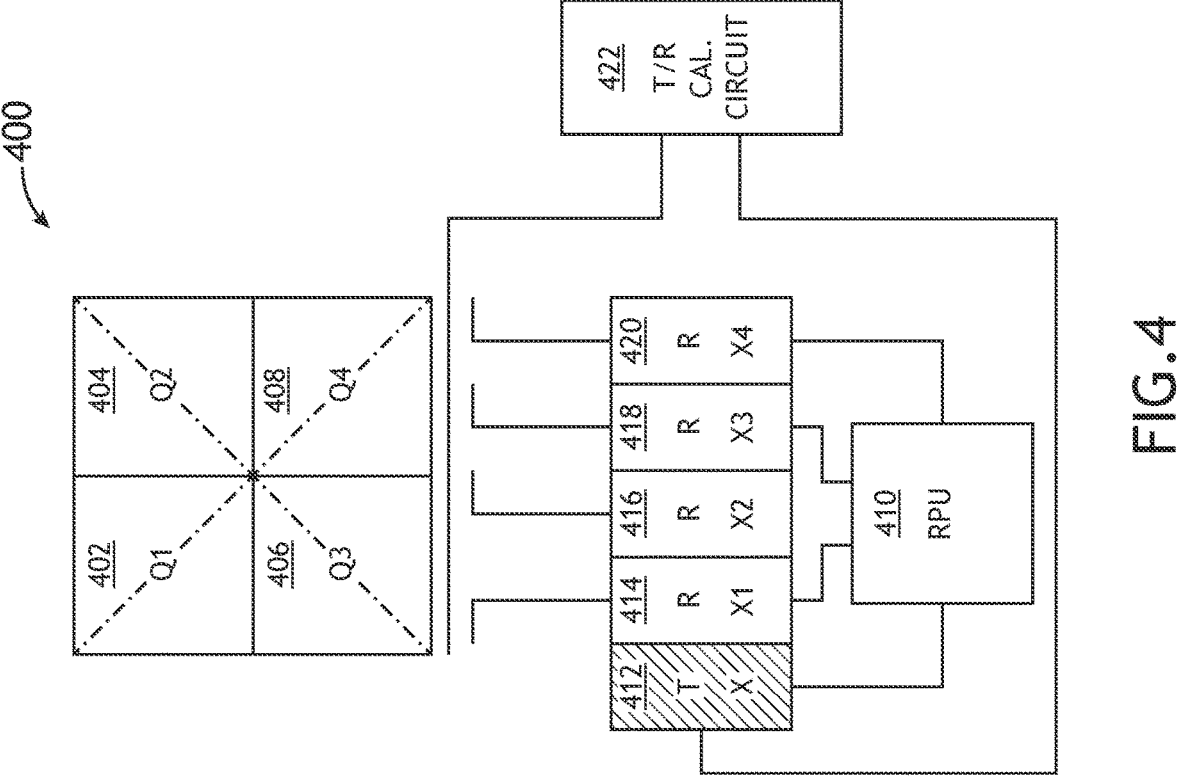
FIG. 4 shows a block diagram of a system suitable for implementing an exemplary embodiment.

Referring to FIG. 4, a block diagram of a system suitable for implementing an exemplary embodiment is shown for the initial step of XR-only amplitude and phase relative channel balance calibration. During calibration of an XR, Tx lines 412 are delay matched. A radar processing unit 410 in the XR may accurately determine relative amplitude and phase differences across Rx channels 414, 416, 418, 420, each channel 414, 416, 418, 420 corresponding to a quadrant 402, 404, 406, 408 of an AESA 400. In at least one embodiment, balanced amplitude and phases are expressed I/Q values for each receive channel. Once the XR is self-calibrated, the XR's I/Q value for each channel 414, 416, 418, 420 may be used to indirectly measure relative amplitude and phase differences between the radiating element channels within an AESA 400.

The XR is calibrated relative to itself. Tx loopback circuitry may be implemented within the XR to each channel. Each channel 414, 416, 418, 420 is calibrated via I/Q balancing across the XR's channels in a relative sense.

Figure 5A:
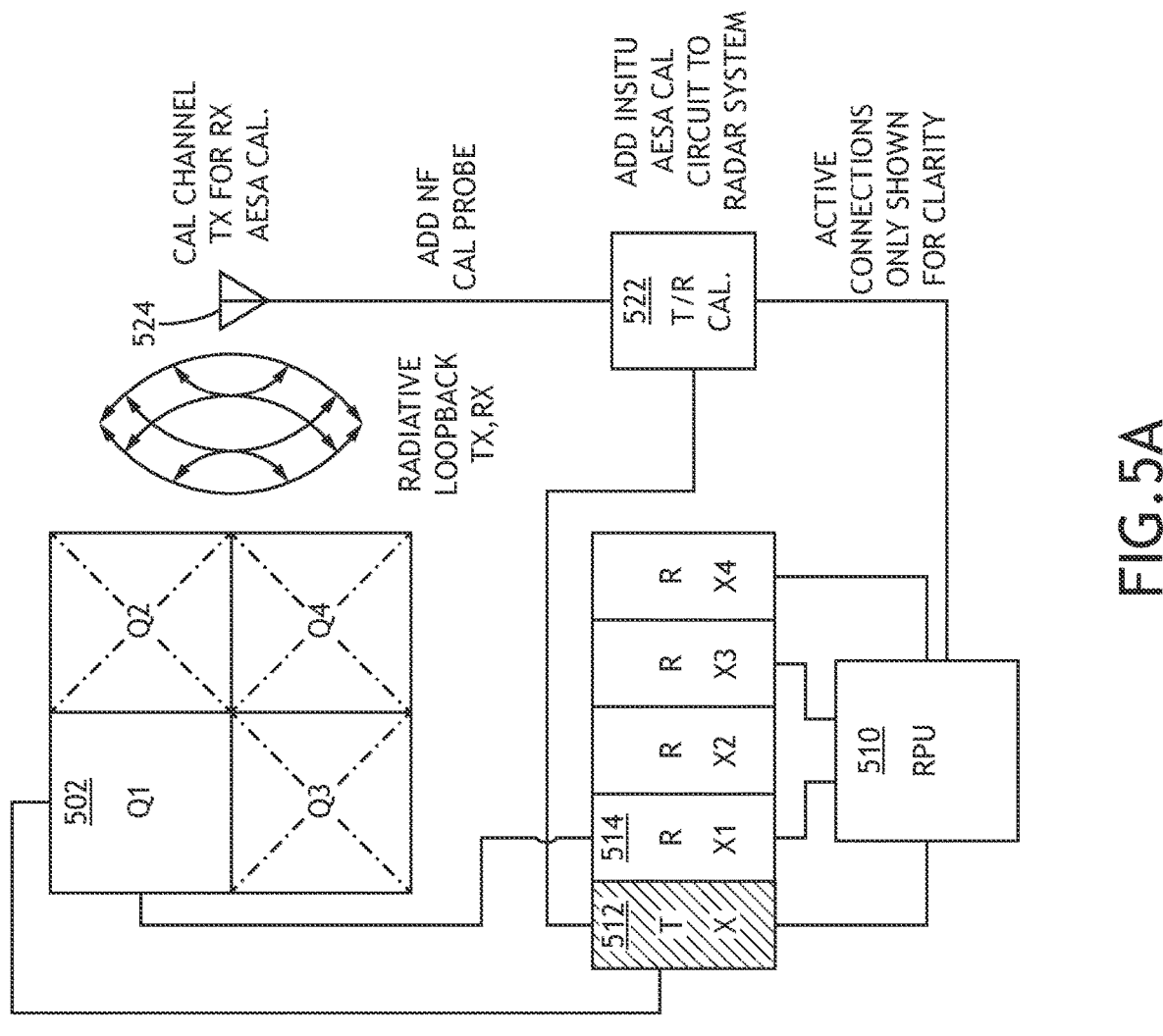
FIG. 5A shows a block diagram of the system in FIG. 4 during a phase of calibration.
Figure 5B:
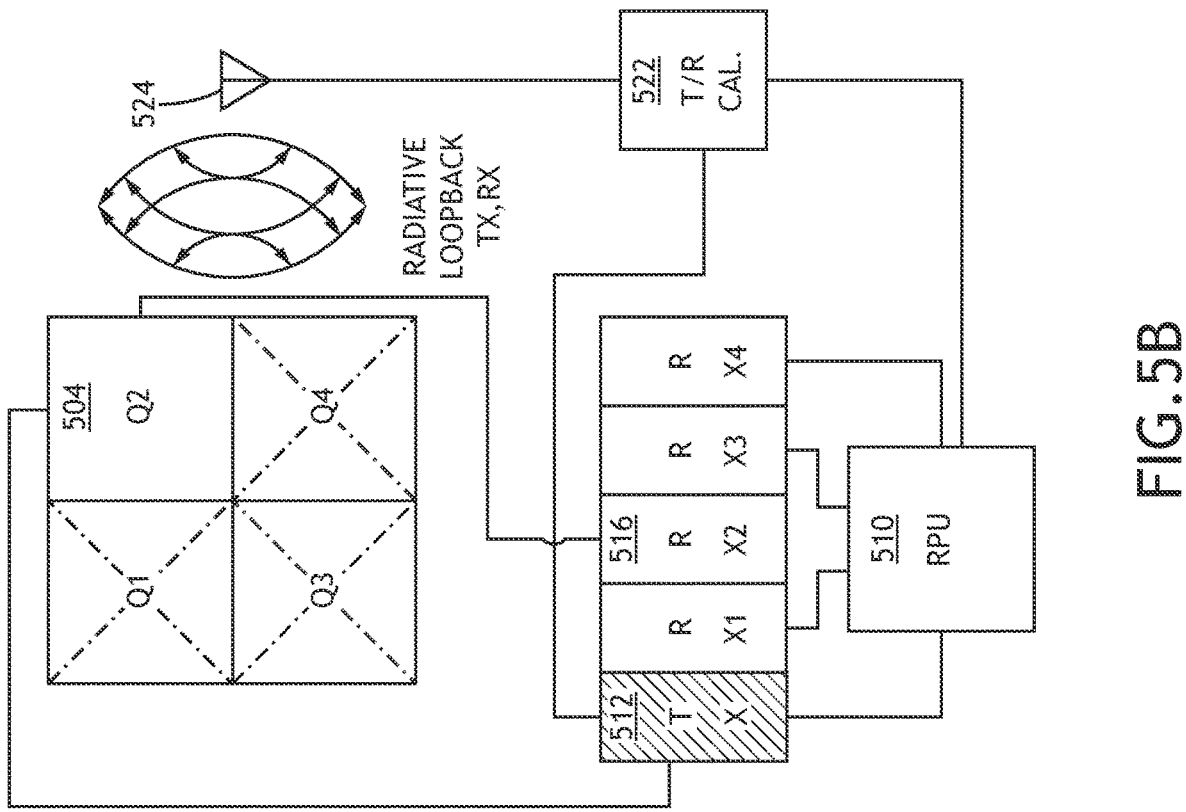
FIG. 5B shows a block diagram of the system in FIG. 4 during a phase of calibration.
Figure 5C:
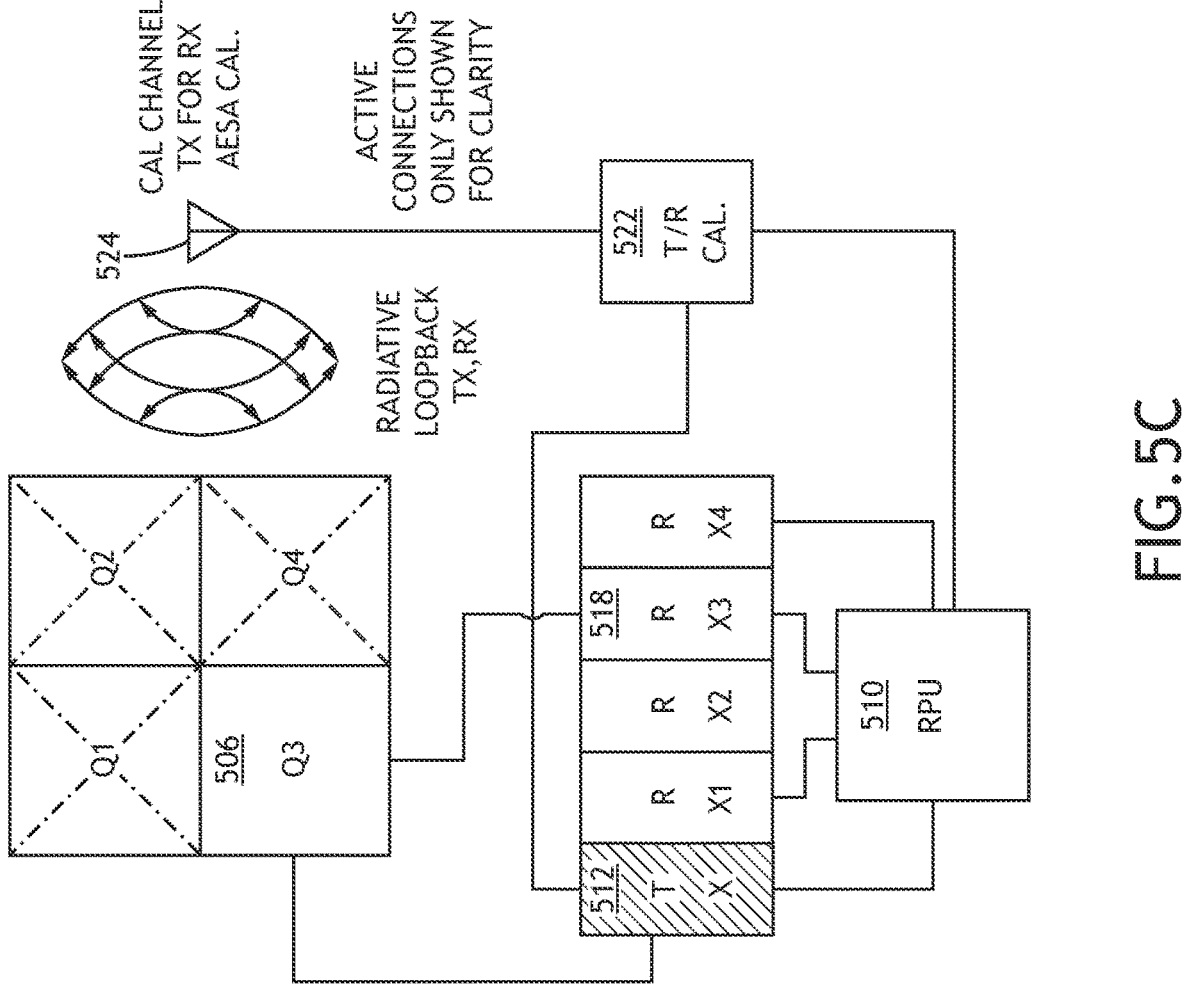
FIG. 5C shows a block diagram of the system in FIG. 4 during a phase of calibration.
Figure 5D:
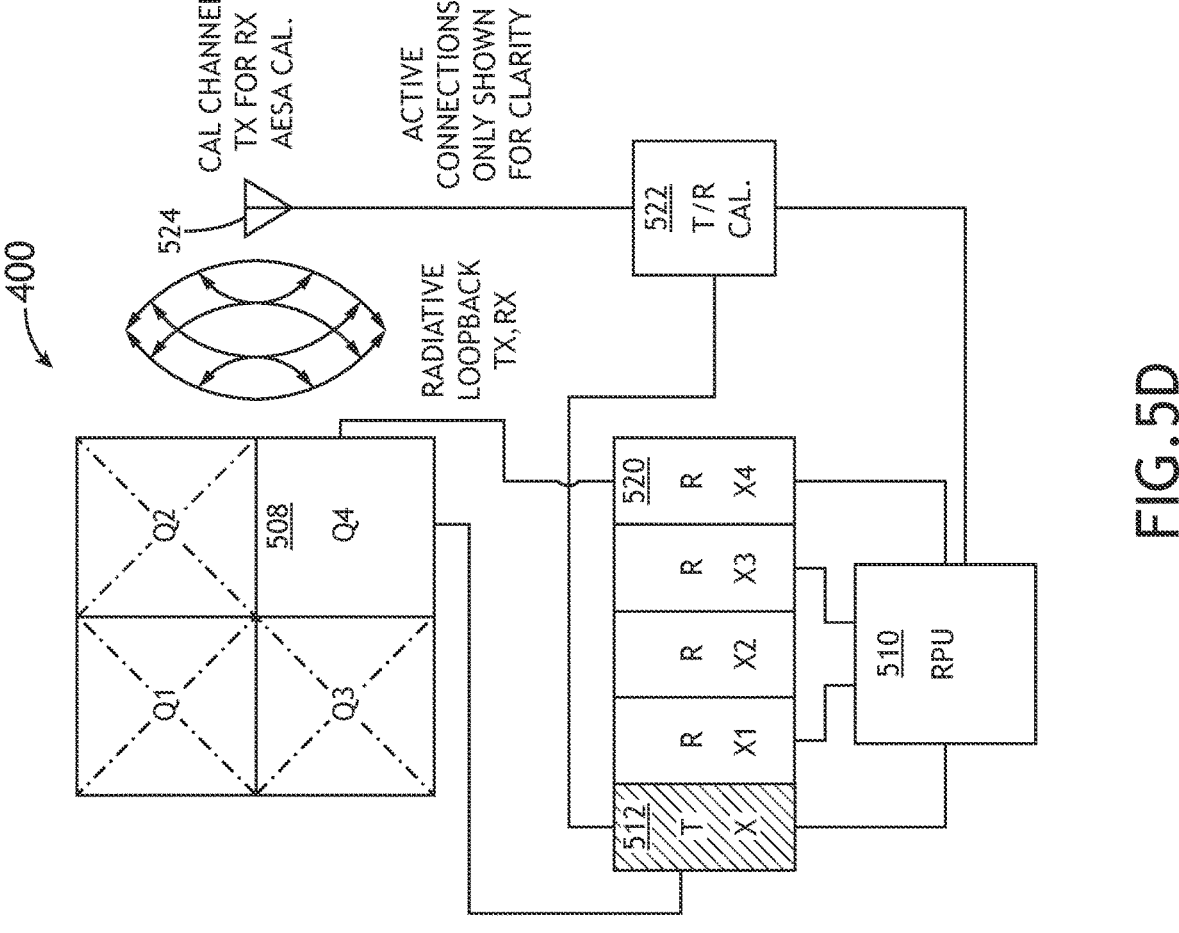
FIG. 5D shows a block diagram of the system in FIG. 4 during a phase of calibration.

In at least one embodiment, a T/R calibration circuit 422 initially can provided Tx and Rx level shifts to relative adequate signal-to-noise ratios between each channel of the XR as shown. T/R cal. circuit may not be needed for XR-only self cal. In some embodiments, after the initial XR-self cal., 422 can then be used for signal level shifting within the AESA radiation coupling loop, as shown by the T/R calibration circuit 522 in FIG. 5A. XR architecture (as detailed in FIG. 3) may minimize Tx-to-Rx signal coupling, and compensate for magnitude/phase uncertainly due to clock reference instability.

While specific embodiments described herein have been directed toward receive (Rx) AESA calibration, the principles are also applicable to transmit (Tx) AESA calibration if the Tx architecture is multi-channel. Once the XR is self-calibrated, the AESA subarrays may be operated in a transmit mode and any or all of XR's receive channels, 414, 416, 418, 420, can receive the Tx AESA subarray signals by means of the same near field probe as described herein. Furthermore, embodiments including multiple calibration circuits and/or multiple Tx channels are envisioned.

Referring to FIGS. 5A-5D, block diagrams of the system in FIG. 4 during phases of calibration are shown. Once an XR is calibrated internally, the calibration system iteratively calibrates a first quadrant 502 or subarray of the AESA. A near field calibration probe 524 may be disposed in the near field of the AESA to perform radiative loopback measurements. It is desirable to embed the near field probe within the AESA's aperture assembly. A T/R calibration circuit 522 may be in electronic communication with the near field probe 524 and a Tx channel 512. The Tx channel 512 and near field probe 524 may work in concert with the T/R calibration circuit 522 to calibrate the first quadrant 502 in the receive mode.

In at least one embodiment, known code sequences can be run at the I/Q level. Once the first quadrant 502 is self-calibrated, it may be used as a sensor to either directly calibrate the remaining quadrants/subarrays 504, 506, 508, or cross check the calibration of the remaining quadrants/subarrays 504, 506, 508, all within the receive mode.

In at least one embodiment, the calibration system may iteratively, sequentially calibrate the remaining quadrants or subarrays 504, 506, 508 of the AESA. At each step, the Tx channel 512 and near field probe 524 work in concert with the T/R calibration circuit 522 to calibrate I/Q values for the corresponding quadrant 504, 506, 508. Furthermore, the corresponding Rx channel 514, 516, 518, 520 may be in data communication with a radar processing unit 510 to perform calibration steps through both Tx channels 512 and Rx channels 514, 516, 518, 520.

In at least one embodiment, after the individual quadrants are iteratively calibrated 204, 206, 208, 210, the calibration system may calibrate 212 amplitude and phase to the full aperture of the array. Known code sequences can be run at the I/Q level to only adjust amplitude and phase at the quad levels relative to each other. At which point, the entire AESA is calibrated.

Embodiments of the resent disclosure calibrate an XR for further calibration of the AESA. It is sufficient to ensure that the relative channel-to-channel amplitude and phase balance calibration of the XR is precise relative to each other. Once the XR is self-calibrated, certain existing calibration processes may be applied using the XR as the signal analyzer based on a relative amplitude and phase phenomena. In at least one embodiment, the signal is analyzed via Hadamar orthogonality linear algebra.

The XR transceiver calibration may use the radar receiver and Hadamard matrix algebra. With the XR in the near field environment, the system may be embedded in the AESA itself, connected to the radar transceiver. Hadamard matrix algebra is more computationally efficient and faster. To do the array calibration, the system uses the transceiver. Calibration can be done in a production test environment or on the radar, and it can be done as a function of mission phasing of the radar in a given flight based on changes to internal and external environmental effects, on demand, or the like, or it can be long term.

In at least one embodiment, the system may employ a sniffer per quadrant. Alternatively, a sniffer may be employed per four quadrants.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor in data communication with an active electronically scanned array (AESA) and a memory storing processor executable code for configuring the at least one processor to:
receive digitized in-phase (I) and quadrature (Q) values for each of a plurality of receive channels, each associated with one of a plurality of subarrays of the AESA, generated via a radar receiver/excitor (XR);
determine relative amplitude and phase differences between the plurality of subarrays of the AESA using the digitized I/Q values;
balance the relative amplitudes and phases for each of the plurality of receive channels relative to each other; and
iteratively calibrate each subarray of the AESA by calculating specific amplitude and phase values for the corresponding subarray based on the digitized I/Q values, without a separately calibrated measuring device.

2. The computer apparatus of claim 1, further comprising a loopback circuit, wherein the at least one processor is further configured to determine a Tx and Rx level shift between each of the plurality of receive channels.

3. The computer apparatus of claim 1, wherein the at least one processor is further configured to:
drive at least one radiating element in a subarray of the AESA;
receive radiative loopback values via a near field probe from the subarray of the AESA; and
perform T/R calibration with respect to the radiative loopback values.

4. The computer apparatus of claim 1, wherein the at least one processor is further configured to balance a relative amplitude and phase for at least one transmit channel.

5. The computer apparatus of claim 1, wherein the at least one processor is further configured to use a first subarray as a sensor in subsequent calibration steps after the first subarray is calibrated.

6. The computer apparatus of claim 1, wherein the at least one processor is further configured to:
determine a mission phase; and
recalibrate the AESA according to the based on mission phase, changes to internal and external environmental effects, or on demand.

7. A method comprising:
receiving digitized in-phase (I) and quadrature (Q) values for each of a plurality of receive channels, each associated with one of a plurality of subarrays of the active electronically scanned array (AESA), generated via a radar receiver/excitor (XR);
determining relative amplitude and phase differences between the plurality of subarrays of the AESA using the digitized I/Q values;
balancing the relative amplitudes and phases for each of the plurality of receive channels relative to each other; and
iteratively calibrating each subarray of the AESA by calculating specific amplitude and phase values for the corresponding subarray based on the digitized I/Q values, without a separately calibrated measuring device.

8. The method of claim 7, further comprising:
driving at least one radiating element in a subarray of the AESA;
receiving radiative loopback values via a near field probe from the subarray of the AESA; and
performing T/R calibration with respect to the radiative loopback values.

9. The method of claim 7, further comprising determining a Tx and Rx level shift between each of the plurality of receive channels.

10. The method of claim 9, further comprising performing I/Q level adjustment among each subarray of the AESA, relative to each other subarray of the AESA.

11. The method of claim 7, further comprising balancing a relative amplitude and phase for at least one transmit channel.

12. The method of claim 7, further comprising:
periodically monitoring AESA health metrics; and
recalibrating the AESA according to the AESA health metrics.

13. A radar system comprising:
an active electronically scanned array (AESA);
a loopback circuit; and
at least one processor in data communication with the AESA and a memory storing processor executable code for configuring the at least one processor to:
receive digitized in-phase (I) and quadrature (Q) values for each of a plurality of receive channels, each associated with one of a plurality of subarrays of the AESA, generated via a radar receiver/excitor (XR);
determine relative amplitude and phase differences between the plurality of subarrays of the AESA using the digitized I/Q values;
balance the relative amplitudes and phases for each of the plurality of receive channels relative to each other; and
iteratively calibrate each subarray of the AESA by calculating specific amplitude and phase values for the corresponding subarray based on the digitized I/Q values, without a separately calibrated measuring device.

14. The radar system of claim 13, wherein the at least one processor is further configured to:
drive at least one radiating element in a subarray of the AESA;
receive radiative loopback values via a near field probe from the subarray of the AESA; and
perform T/R calibration with respect to the radiative loopback values.

15. The radar system of claim 13, wherein the at least one processor is further configured to balance a relative amplitude and phase for at least one transmit channel.

16. The radar system of claim 13, wherein the AESA comprises at least a one dimensionally conformal array.

17. The radar system of claim 13, further comprising one or more additional AESAs, wherein the at least one processor is further configured to perform relative amplitude and phase calibration for the one or more additional AESAs.

\* \* \* \* \*